(12) United States Patent
Kleinberger et al.

(10) Patent No.: US 11,255,453 B2
(45) Date of Patent: Feb. 22, 2022

(54) WEIGHT-ACTUATED SPRING-BIASED VALVE

(71) Applicant: PRODEW, INC., Marietta, GA (US)

(72) Inventors: Itamar Kleinberger, Marietta, GA (US); Shakeel Merchant, Atlanta, GA (US); Paul Wilhelm, Roswell, GA (US); Kendall C. Palmer, Hiram, GA (US); Roland Bilodeau, Canton, GA (US); Faizan Aly, Smyrna, GA (US)

(73) Assignee: PRODEW, INC., Marietta, GA (US)

( * ) Notice: Subject to any disclaimer, the term of this patent is extended or adjusted under 35 U.S.C. 154(b) by 295 days.

(21) Appl. No.: 16/668,615

(22) Filed: Oct. 30, 2019

(65) Prior Publication Data

US 2020/0132207 A1 Apr. 30, 2020

Related U.S. Application Data

(60) Provisional application No. 62/790,779, filed on Jan. 10, 2019, provisional application No. 62/752,831, filed on Oct. 30, 2018.

(51) Int. Cl.
*F16K 31/00* (2006.01)
*F16K 31/12* (2006.01)
(Continued)

(52) U.S. Cl.
CPC .......... *F16K 31/001* (2013.01); *B01F 3/0865* (2013.01); *B01F 15/026* (2013.01);
(Continued)

(58) Field of Classification Search
CPC ...... F16K 21/04; F16K 21/165; F16K 31/001; F16K 31/602; F16K 31/52458; F16K 31/522; F16K 31/12; F16K 31/563; F16K 21/16; B01F 3/0865; B01F 5/0413; B01F 5/026; B01F 15/0261; E03C 1/046;
(Continued)

(56) References Cited

U.S. PATENT DOCUMENTS 4,938,453 A * 7/1990 Blanchard ............. F16K 5/0647
251/313
5,031,258 A * 7/1991 Shaw ................... G08B 21/245
4/623

(Continued)

*Primary Examiner* — Craig J Price
*Assistant Examiner* — Andrew J Rost
(74) *Attorney, Agent, or Firm* — Gardner Groff & Greenwald, PC

(57) ABSTRACT

A control mechanism locks open a spring-loaded valve and automatically releases the spring-loaded valve to close upon a predetermined lesser weight load being applied. The spring-loaded valve includes a flow valve, a valve lever that pivots between open and closed positions, and a valve spring that biases the valve lever to the closed position. The control mechanism includes a pivotal release lever having an engagement arm and an opposite load arm, and a release spring that biases the release lever from a blocking position with the engagement arm retaining the valve lever in its open position to a release position with the valve lever free to pivot past the engagement arm and to the closed position under the valve spring force. The load arm includes an additive-container support for a load of an additive fluid to be mixed with a carrier fluid whose flow is controlled by the valve.

20 Claims, 12 Drawing Sheets

(51) Int. Cl.
  *F16K 21/04* (2006.01)
  *B01F 3/08* (2006.01)
  *B01F 15/02* (2006.01)
  *F16K 31/56* (2006.01)
  *F16K 21/16* (2006.01)

(52) U.S. Cl.
  CPC ............ *F16K 21/04* (2013.01); *F16K 21/165* (2013.01); *F16K 31/12* (2013.01); *F16K 31/563* (2013.01)

(58) Field of Classification Search
  CPC .......... E03C 1/0465; B67D 2001/1259; B67D 2001/1261; A47K 5/121; A47K 2005/1218
  See application file for complete search history.

(56) References Cited

U.S. PATENT DOCUMENTS

| | | | | |
|---|---|---|---|---|
| 5,199,118 | A * | 4/1993 | Cole | A47K 1/04 4/619 |
| 5,781,942 | A * | 7/1998 | Allen | G08B 21/245 4/623 |
| 6,253,785 | B1 * | 7/2001 | Shumake, Jr | F16K 21/18 122/504 |
| 6,533,243 | B1 * | 3/2003 | Sumner | F16K 31/563 251/303 |
| 6,899,122 | B1 * | 5/2005 | Mele | F16K 31/001 122/504 |
| 7,665,482 | B2 * | 2/2010 | McLean | F16K 31/32 137/420 |
| 8,443,823 | B1 * | 5/2013 | Prager | F16K 17/40 137/68.11 |
| 9,574,679 | B2 * | 2/2017 | Schwarzbek | F16K 31/32 |
| 9,913,562 | B2 * | 3/2018 | Wegelin | A47K 5/1217 |
| 10,760,706 | B2 * | 9/2020 | Schwarzbek | F16K 31/18 |

* cited by examiner

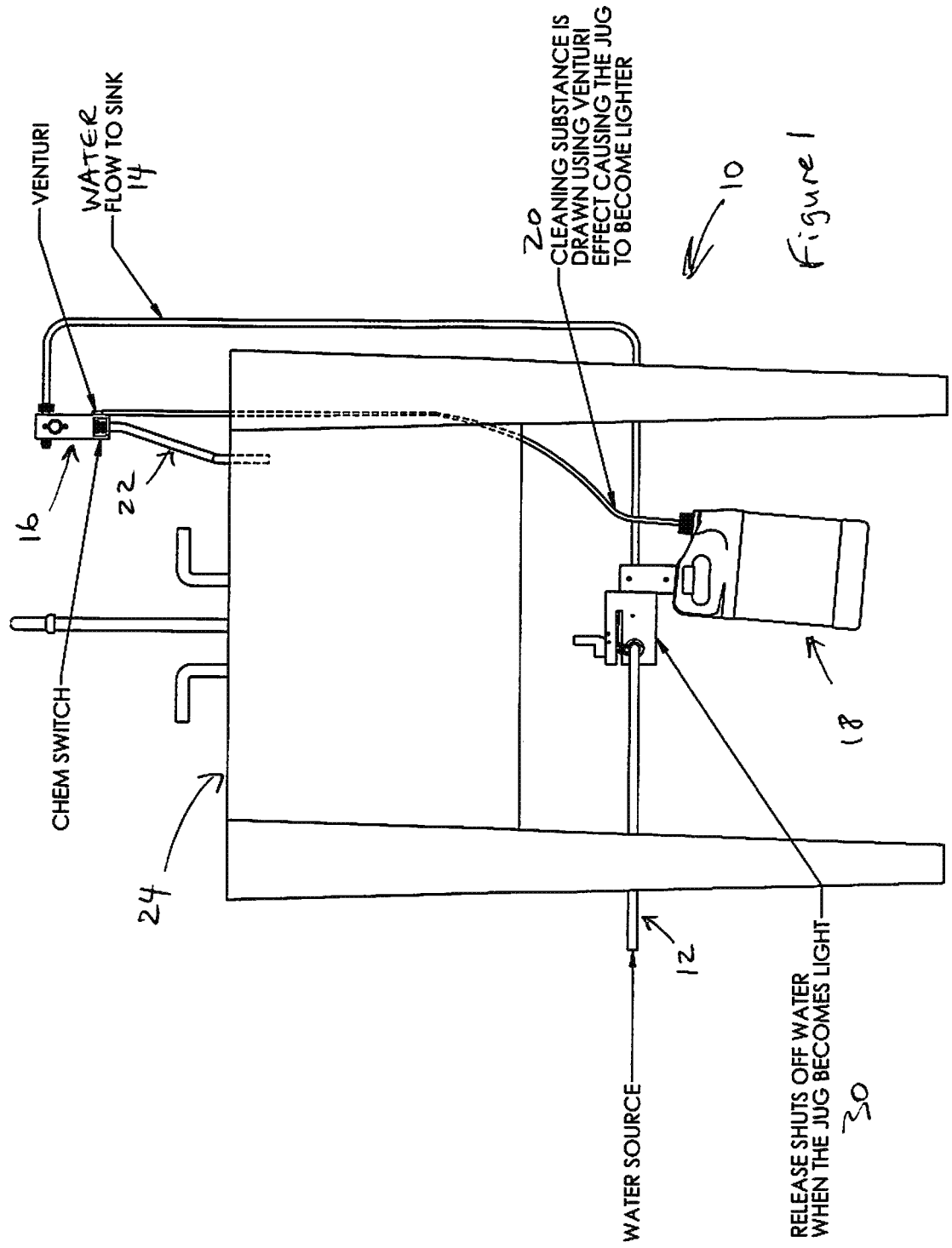

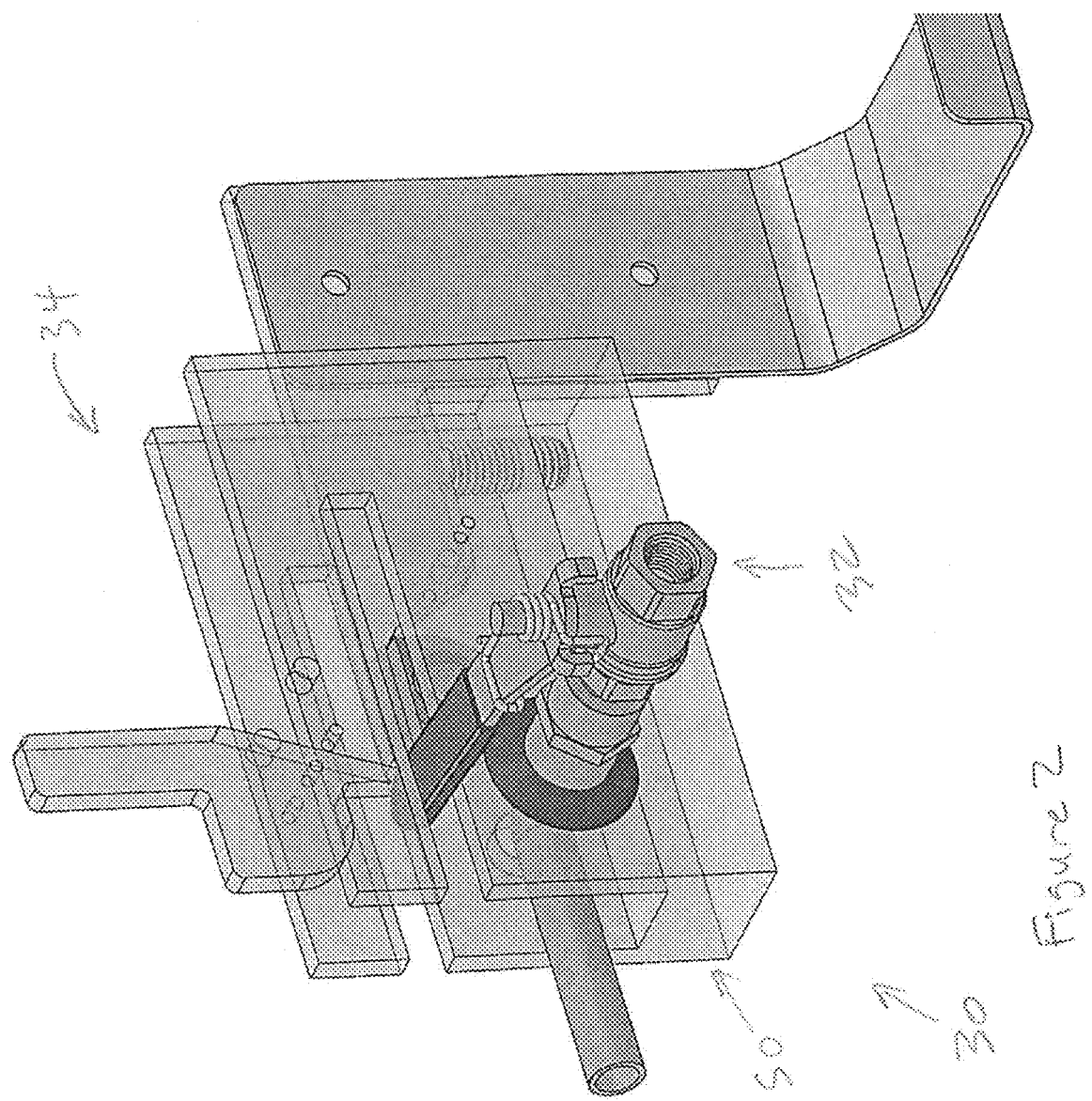

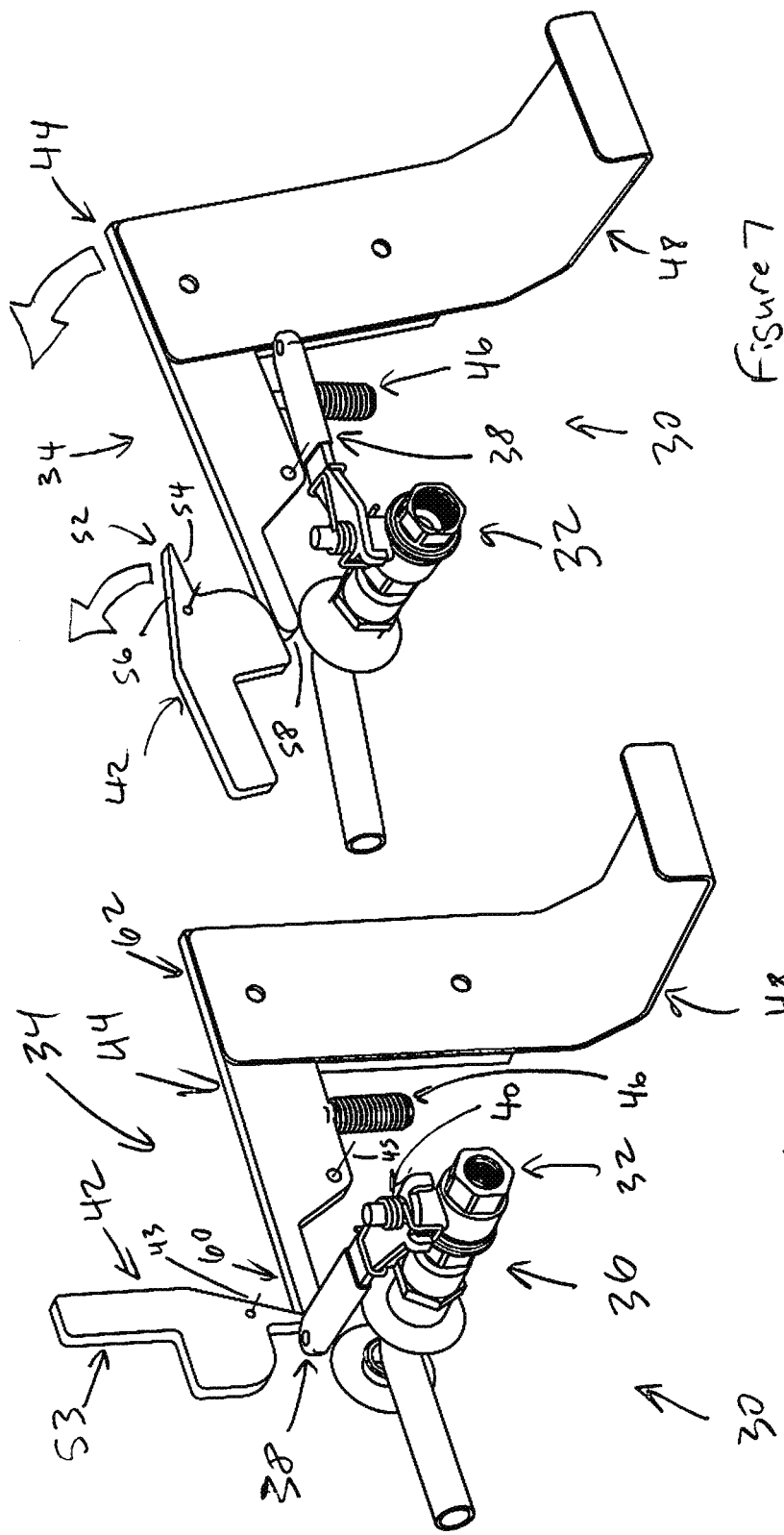

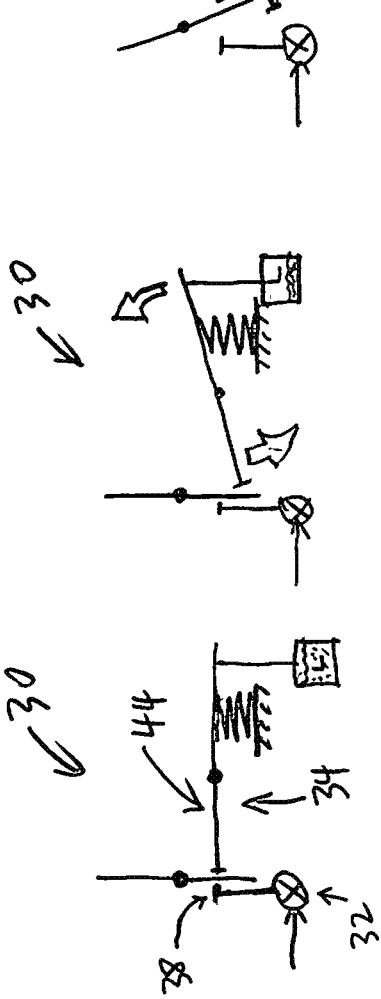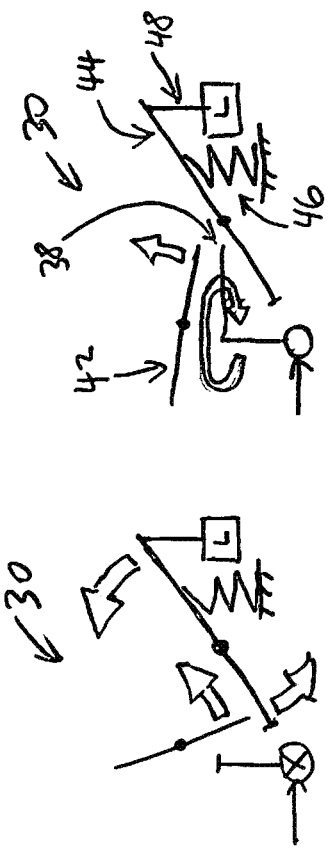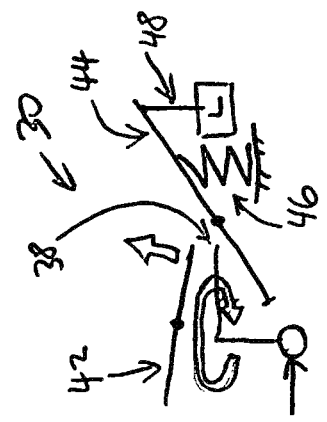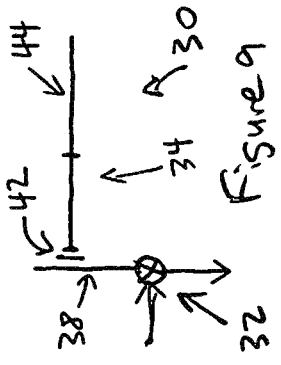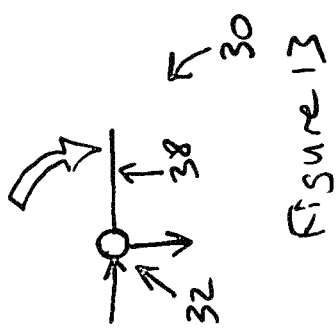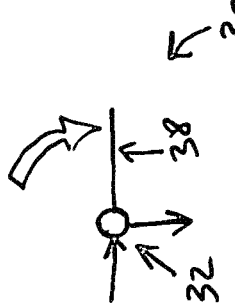

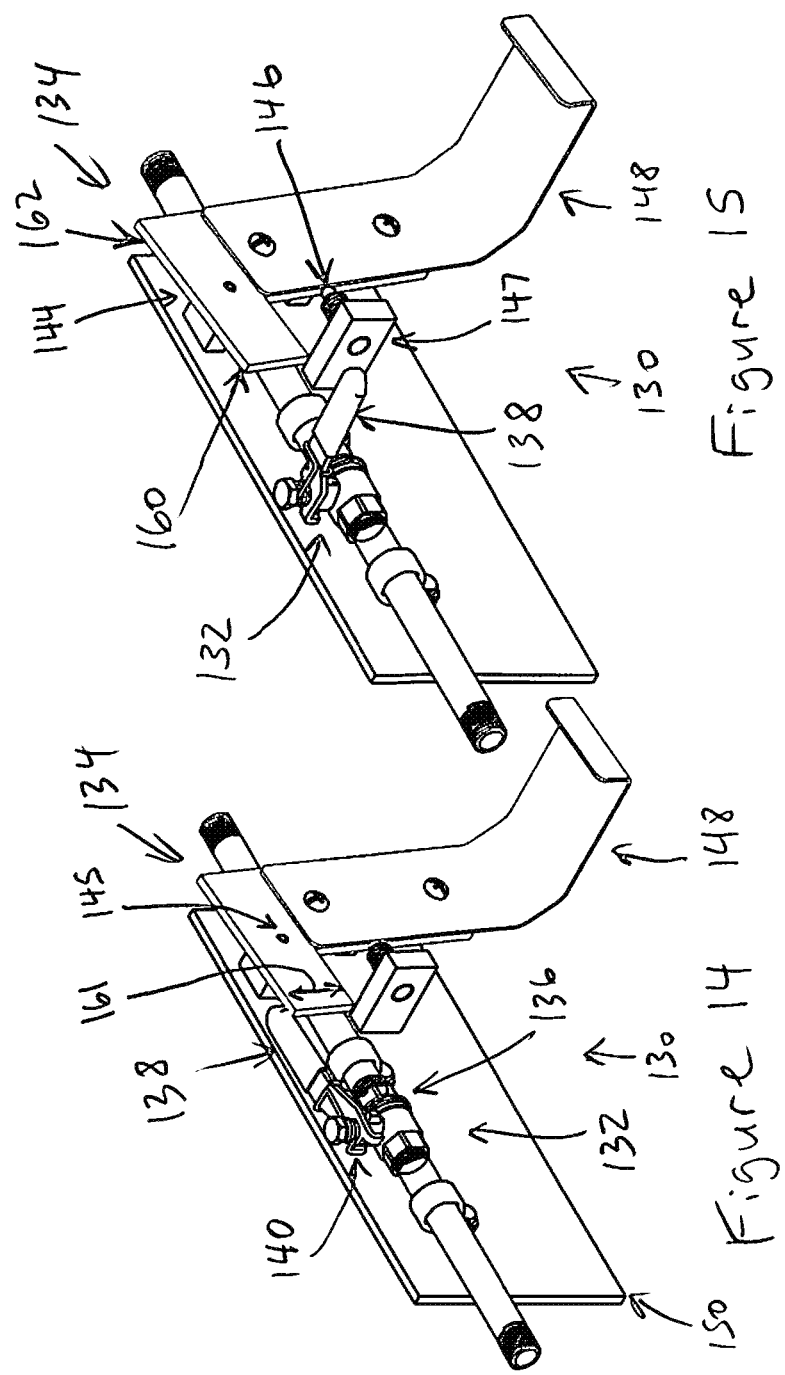

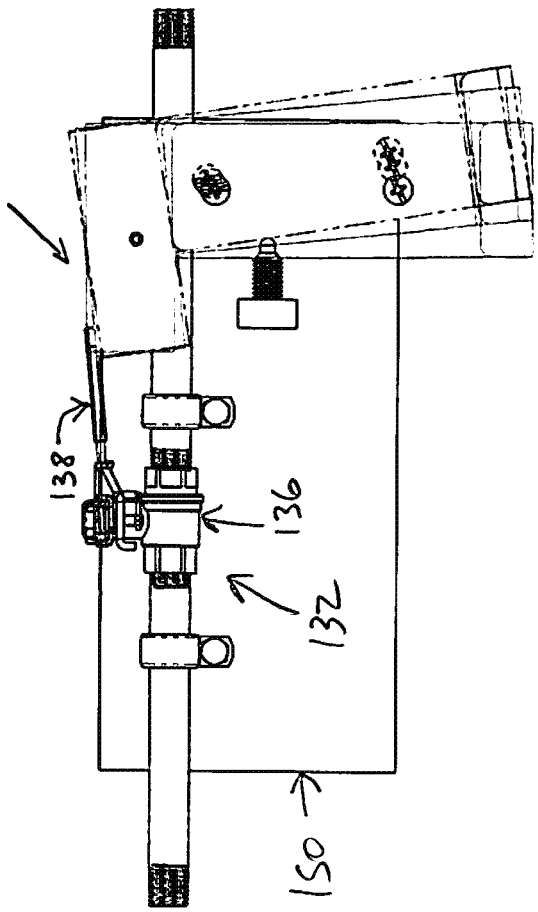
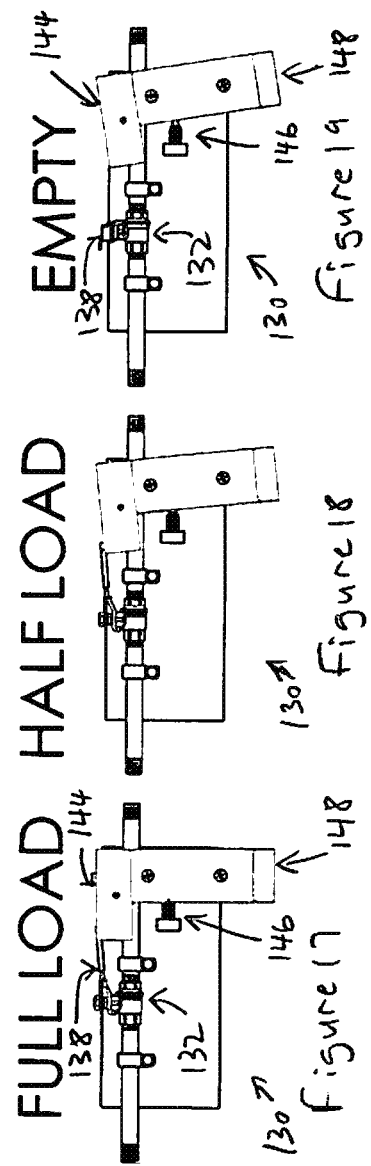

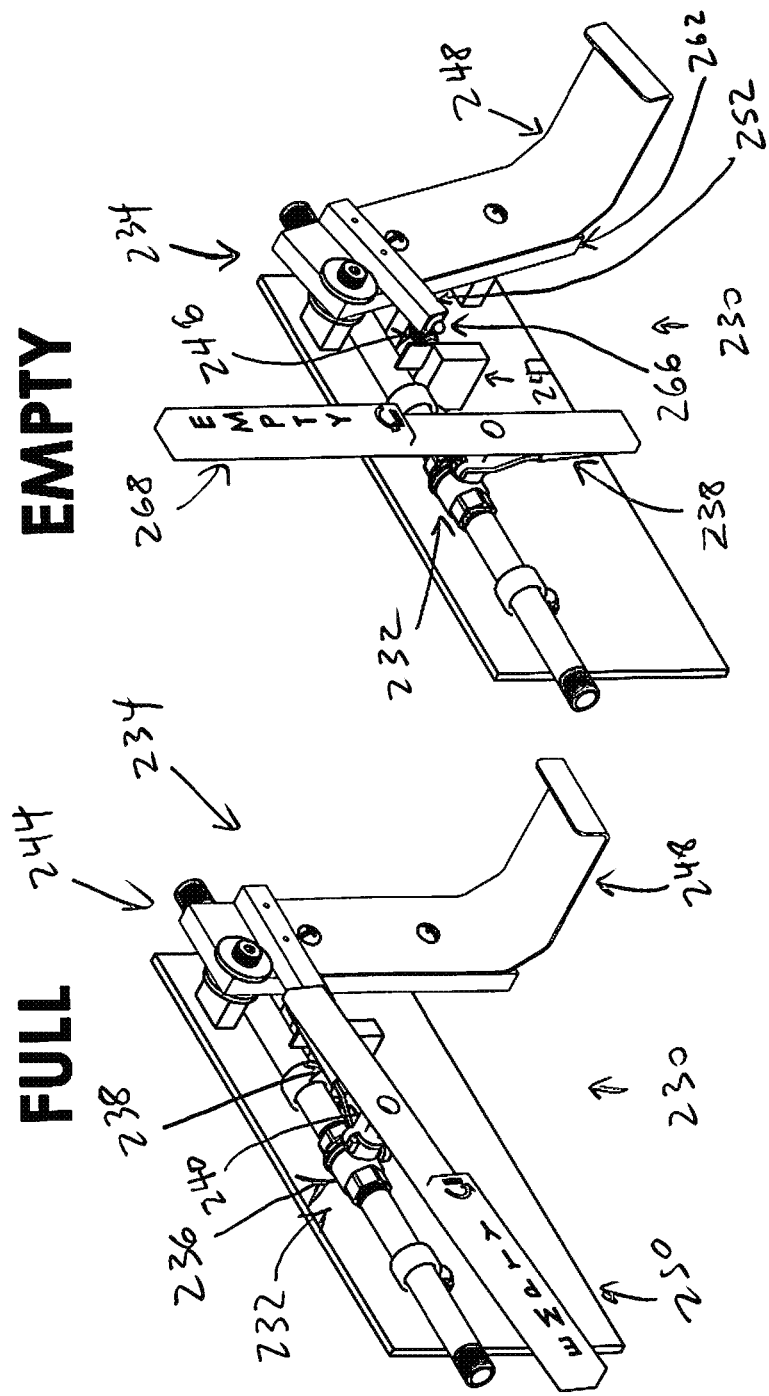

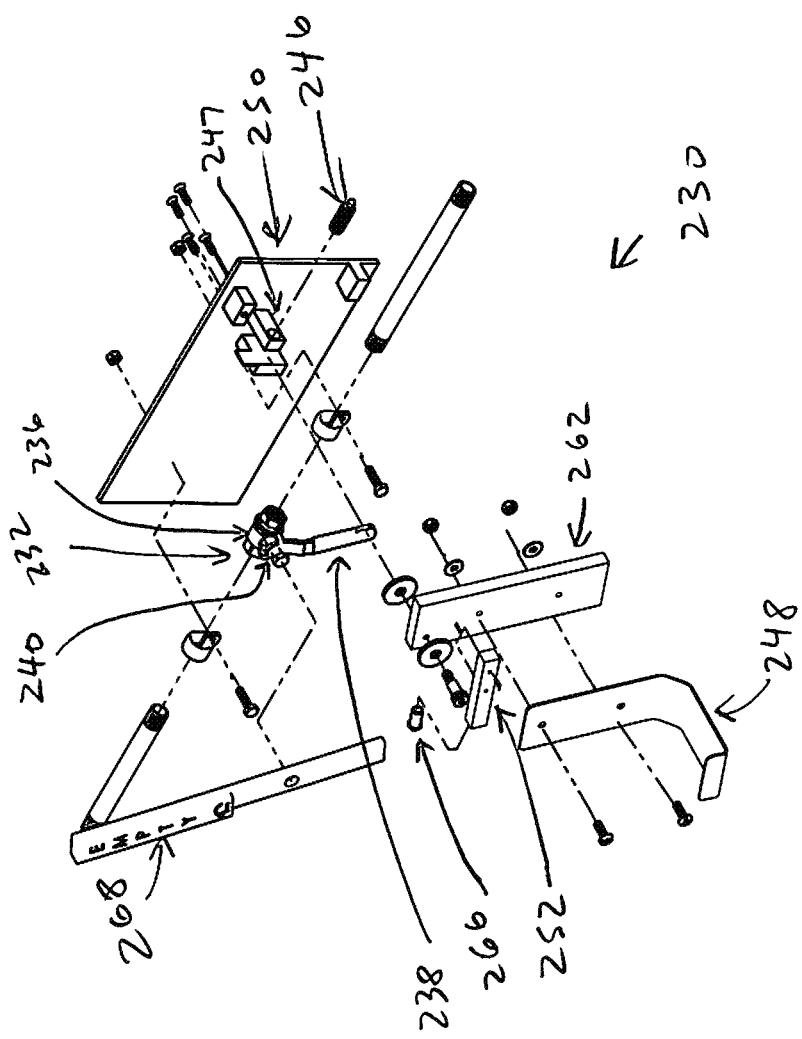

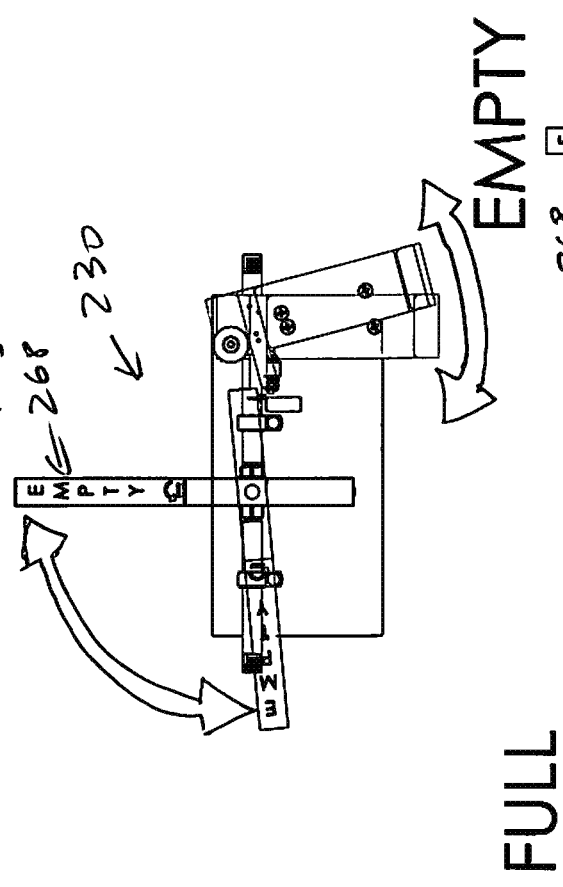
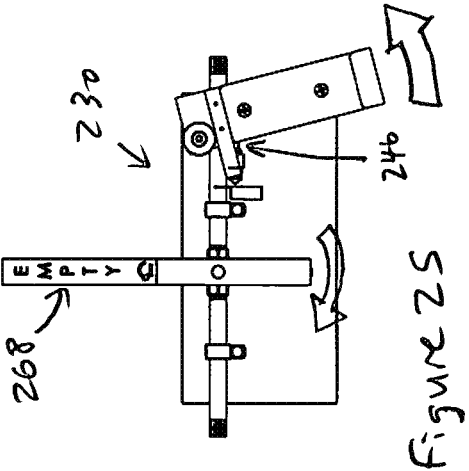
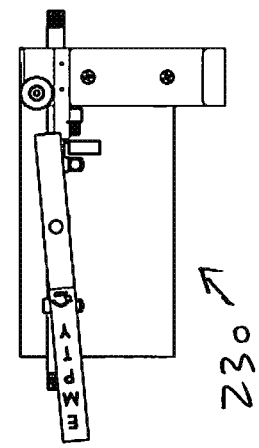

WEIGHT-ACTUATED SPRING-BIASED VALVE

CROSS-REFERENCE TO RELATED APPLICATIONS

This application claims the priority benefit of U.S. Provisional Patent Application Ser. No. 62/790,779 filed Jan. 10, 2019, and U.S. Provisional Patent Application Ser. No. 62/752,831 filed Oct. 30, 2018, the entireties of which are hereby incorporated herein by reference for all purposes.

TECHNICAL FIELD

The present invention relates generally to the field of control valves for forming chemical solutions, and more particularly to systems and methods for controlled delivery of sanitizer solutions for cleaning food-handling items.

BACKGROUND

Many grocery stores and other food-handling facilities have back areas for handling and/or packing food, and those areas commonly have sinks for cleaning food utensils, pans, and trays. Typically, the sinks have three sections: the first for cleaning with water and sanitizer, the second for rinsing with water, and the third for sanitizing with water and sanitizer. The clean and sanitize sinks thus use a chemical concentrate liquid sanitizer that is provided in a container (e.g., a plastic jug) and metered into a stream of water to form a liquid sanitizer solution that fills these two sinks. During use, the container eventually empties of the chemical concentrate, and a worker has to be alert to this. Upon visual detection of depletion of the chemical concentrate, the water must be shut off and the chemical concentrate replenished. Otherwise, running the sink water without the chemical concentrate additive would allow contaminants (bacteria, dirt, etc.) to remain on the food-handling items to be cleaned and then come in contact with food items to be consumed by people.

Accordingly, it can be seen that needs exist for improvements in systems and methods for delivering chemical solutions for uses such as sanitizing food-handling items. It is to the provision of solutions meeting these and other needs that the present invention is primarily directed.

SUMMARY

Generally described, the present invention relates to a weight-actuated spring-biased valve device for controlling fluid flow. A control mechanism locks open a spring-loaded valve and automatically releases the spring-loaded valve to close upon a predetermined lesser weight load being applied. The spring-loaded valve includes a flow valve, a valve lever that pivots between open and closed positions, and a valve spring that biases the valve lever to the closed position. The control mechanism includes a pivotal release lever having an engagement arm and an opposite load arm, and a release spring that biases the release lever from a blocking position with the engagement arm mechanically interfering with and retaining the valve lever in its open position to a release position with the valve lever free to pivot past the engagement arm and to its closed position under the valve spring force. The load arm includes an additive-container support for a load of an additive fluid to be mixed with a carrier fluid whose flow is controlled by the valve.

In use, the weight force of the additive fluid supported by the additive-container support is greater than the release spring force, so this weight load holds the release lever in its blocking position. Upon removal of the weight load on the additive-container support from depletion of the additive fluid, the release spring discharges to pivotally displace the release-lever engagement arm enough to disengage from and release the valve lever. The valve spring then discharges to pivot the released valve lever to its closed position to automatically shut off the supply of the carrier fluid. In this way, the carrier fluid does not continue flowing after the additive fluid has been depleted.

These and other aspects, features, and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

BRIEF DESCRIPTION OF THE DRAWINGS

FIG. 1 is a perspective view of a sanitizer dispensing system including a weight-actuated spring-biased control valve according to a first example embodiment of the present invention.

FIG. 2 is a perspective view of the control valve of FIG. 1.

FIG. 6 is a perspective view of the control valve of FIG. 2 shown in an open position with the release mechanism locking the valve lever there.

FIG. 7 shows the control valve of FIG. 6 in a normally closed position after operation of the release mechanism to free the valve lever to be spring-driven there.

FIG. 8 is a side-view schematic diagram of the control valve of FIG. 2 shown in an open position, with a full supply of the additive, and with the release mechanism locking the valve lever there.

FIG. 9 is a top-view schematic diagram of the control valve of FIG. 8.

FIG. 10 shows the control valve of FIG. 8 still in the open position but with the additive supply nearly depleted.

FIG. 11 shows the control valve of FIG. 9 still in the open position but with the additive supply depleted and the release mechanism being operated.

FIG. 12 shows the control valve of FIG. 9 in the normally closed position after operation of the release mechanism to free the valve lever to be spring-driven there.

FIG. 13 is a top-view schematic diagram of the control valve of FIG. 12.

FIG. 14 is a perspective view of a weight-actuated spring-biased control valve, for example for use in a sanitizer dispensing system, according to a second example embodiment of the present invention, shown in an open position with the release mechanism locking the valve lever there.

FIG. 15 shows the control valve of FIG. 14 in a normally closed position after operation of the release mechanism to free the valve lever to be spring-driven there.

FIG. 16 is a side view of the control valve of FIG. 14 in multiple operational positions (shown superimposed together), including the open position of FIG. 14, still in the open position but with the additive supply nearly depleted, and in the normally closed position of FIG. 15.

FIGS. 17-19 show the control valve of FIG. 16 in each of the operational positions: the open position, still in the open position but with the additive supply nearly depleted, and in the normally closed position, respectively.

FIG. 20 is a perspective view of a weight-actuated spring-biased control valve, for example for use in a sanitizer dispensing system, according to a third example embodiment of the present invention, shown in an open position with the release mechanism locking the valve lever there.

FIG. 21 shows the control valve of FIG. 20 in a normally closed position after operation of the release mechanism to free the valve lever to be spring-driven there.

FIG. 22 is an exploded view of the control valve of FIG. 20.

FIG. 23 is a side view of the control valve of FIG. 20 in multiple operational positions (shown superimposed together), including the open position of FIG. 20 and the normally closed position of FIG. 21.

FIGS. 24-25 show the control valve of FIG. 23 in the open position and the normally closed position, respectively.

DETAILED DESCRIPTION OF EXAMPLE EMBODIMENTS

Figure 4:
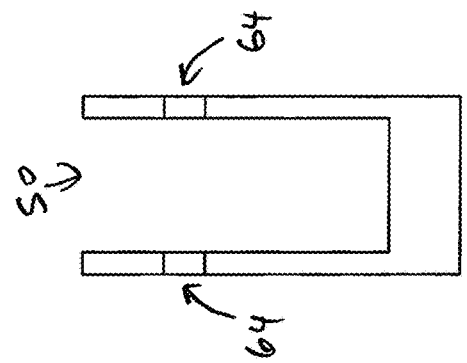
FIG. 4 is an end view of the control-valve mount of FIG. 3.
Figure 5:
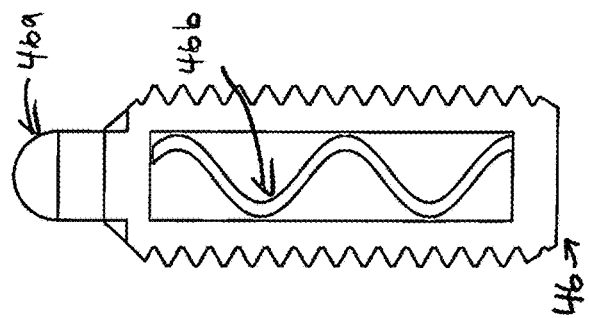
FIG. 5 is a side cross-sectional view of a spring device of the control valve of FIG. 2.

The present invention may be understood more readily by reference to the following detailed description of example embodiments taken in connection with the accompanying drawing figures, which form a part of this disclosure. It is to be understood that this invention is not limited to the specific devices, methods, conditions, or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

With reference now to the drawing figures, wherein like reference numbers represent corresponding parts throughout the several views, FIGS. 1-13 show a fluid-mixture dispensing system 10 including a weight-actuated spring-biased control valve device 30 according to a first example embodiment of the present invention. The fluid-mixture dispensing system 10 mixes an additive fluid (e.g., a solute) with a carrier fluid (e.g., a solvent) to produce the fluid mixture for delivery for its intended use. And the weight-actuated spring-biased valve device 30 operates to shut off the flow of the carrier fluid to be mixed with the additive fluid upon depletion of the additive fluid to ensure a proper resulting mixture/concentration.

In the depicted embodiment, the fluid-mixture dispensing system 10 (including the weight-actuated spring-biased control valve device 30) mixes a chemical concentrate liquid sanitizer (the additive fluid or solute) with water (the carrier fluid or solvent) to produce a sanitizer solution (the fluid mixture) and deliver the sanitizer solution to a sink (or other reservoir or container) for cleaning and sanitizing use on food-handling items (e.g., food utensils, pans, and trays). As shown in FIG. 1, for example, the sanitizer-dispensing system 10 can include a water line 12 to the control valve device 30, a water line 14 from there to a mixing device (e.g., including a venturi and a chemical switch) 16, an additive container (e.g., a plastic jug) 18, an additive line 20 from there to the mixing device 16, and a mixture line 22 from there to the sink 24. These example components used with the control valve device 30 are all conventional, commercially available, and well-known in the art, and thus are not described in detail for purposes of brevity.

It will be understood that the weight-actuated spring-biased control valve device 30 can be included and used in other fluid-mixture dispensing systems than that depicted. As such, the weight-actuated spring-biased control valve device 30 is shown in use with the depicted sanitizer dispensing system 10 (including the sink 24, the venturi-operated mixer 16, the jug 18 for the chemical concentrate, etc.) solely for purposes of illustrating one on many implementations of the invention.

The weight-actuated spring-biased control valve device 30 of the depicted embodiment operates to shut off the flow of water (the carrier fluid or solvent) to be mixed with the chemical concentrate liquid sanitizer (the additive fluid or solute) upon depletion of the chemical concentrate to ensure a proper sanitizer solution mixture/concentration results. The weight-actuated spring-biased control valve device 30 includes a spring-loaded valve 32 and a spring-loaded valve-release control mechanism 34.

The spring-loaded valve 32 includes a flow valve 36, a valve operating lever 38 that moves (e.g., pivots) between an open position (permitting flow through the flow valve 36; FIGS. 6 and 8-9) and a closed position (blocking flow through the flow valve 36; FIGS. 7 and 12-13), and a spring element (e.g., a torsion spring) 40 that biases the valve lever 38 to the closed position. The spring-loaded valve 32 can be of a conventional spring-loaded ball valve type such as for example that commercially available from RuB, Inc. under part number S95. In other embodiments, the spring-loaded valve can have another type of spring-biased actuator (e.g., a linearly retracting/extending lever, telescopic plunger, or other displaceable actuator) instead of a pivotal lever and/or another type of spring element (e.g., a coil spring, leaf spring, cantilever spring, machined spring, or other resiliently deformable element) than a torsion spring.

Figure 3:
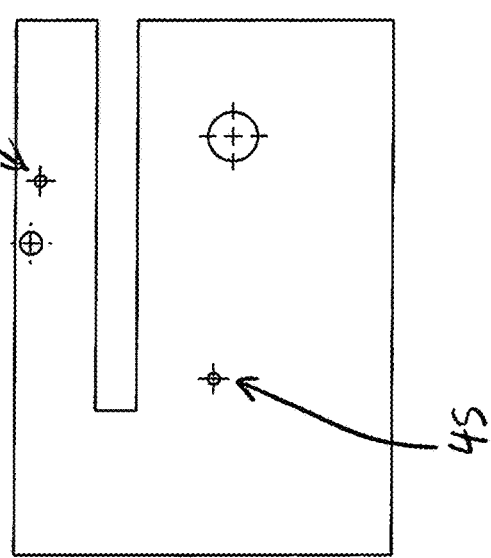
FIG. 3 is a side view of a mount of the control valve of FIG. 2.

The spring-loaded valve-release control mechanism 34 functions to lock the spring-loaded valve 32 in the closed position and selectively release it from there. The spring-loaded valve-release mechanism 34 includes a pivotal trigger 42, a pivotal release lever 44, a release spring device 46, an additive-container support 48, and a mount 50. The pivotal trigger 42 and the pivotal release lever 44 can each be a plate, finger, or other fulcrumed member, the additive-container support 48 can be a hook, pin, or other hanger member, and the mount 50 can be a housing, bracket, channel, or other mounting member, and each can be made of a strong and durable material such as stainless steel or another metal. The trigger 42 and the release lever 44 are pivotally mounted (e.g., by pins or other pivots) 43 and 45 to the mount 50, with the release lever 44 positioned in a pivotal plane that is perpendicular to the linear flow axis of the flow valve 36, and with the spring device 46 biasing the release lever 44 toward the unlocked/release position (e.g., biasing against and between the mount 50 and the release lever 44; FIGS. 2 and 3-4).

The pivotal trigger 42 has an engagement arm 52 that pivots about and extends from its pivot 43 to form a moment arm, and that includes a blocking surface 54 and an opposite linking surface 56. With the pivotal trigger 42 in a locking position, the engagement arm's blocking surface 54 contacts and holds the spring-biased valve lever 38 in the open position from pivoting to the closed position, and the engagement arm's linking surface 56 abuts against a linking surface 58 of the release lever 44 in the blocking position (FIGS. 6 and 8-9). The pivotal trigger's linking surface 56 can be ramped (e.g., angled or curved) relative to the pivotal trigger's blocking surface 54 to allow the pivotal trigger 42 (and thus the valve lever 38) to begin to slowly pivot as the release lever 44 begins to slowly pivot as the chemical additive runs low.

The release lever's linking surface 58 is located on an engagement arm 60 of the pivotal release lever 44 that is opposite from a load arm 62 of the release lever 44 with the pivot point 45 in-between so that the engagement arm 60 and the load arm 62 pivot together and in the same direction. The additive-container support 48 can be provided by a hook (for receiving the handle of a jug container to support the hub in suspension, as depicted), a plate or well (for supporting a base of a container), or a pin, hanger, or other conventional structure for supporting the load of the container.

The additive-container support 48 is located at or on the load arm 62 of the release lever 44 (and can thus be considered an extension thereof), and the spring device 46 biases against the release lever 44 to apply a force on it that is generally opposite from the weight force on the additive-container support 48 (which varies depending on the amount of sanitizer additive remaining in it). In the depicted embodiment, for example, the spring device 46 biases against the release lever load arm 62 and has spring factor selected to be strong enough to drive the release lever 44 from its blocking to its release position when then additive is depleted but weak enough to not overcome the weight/load when the additive is not yet depleted. In other embodiments, the trigger 42 is eliminated and the release lever 44 is modified for direct blocking engagement with the valve lever 38, for example as in the second example embodiment described herein.

The spring device 46 can be of a conventional spring-loaded plunger type having a plunger 46a biased by a spring 46b (FIG. 5) such as for example that commercially available from McMaster Carr under part number 84975A71. In other embodiments, another conventional spring element (e.g., compression, tension, torsion, and/or leaf spring) can be provided and modifications made to the release mechanism 34 to provide the same functional result. Such modifications for including other spring element types could include providing a rigid support post or wall to retain the spring element displacement and resilient return movement in the desired direction/orientation.

The mount 50 (FIGS. 2 and 3-4) can include the pivots 43 and 45 for the pivotal trigger 42 and the pivotal release lever 44, and a slot 64 that receives and through which the valve lever 38 can move when it pivots between its open and closed positions (FIGS. 2 and 3-4). The spring device 46 and the control valve device 30 can also mount to the mount 50, for example as depicted. In other embodiments, the mount is eliminated or modified and the other components (e.g., the pivotal trigger 42, the pivotal release lever 44, and the spring device 46) are mounted to other structures of for example the sanitizer-dispensing system 10 and/or the control valve device 30.

The operation of the weight-actuated spring-biased valve device 30 is schematically depicted in FIGS. 7-13. The pivotal trigger 42 is biased against by the spring-loaded operating lever 38 of the valve 32 and in turn biases against (and is blocked by mechanical interference from pivotal movement by) the pivotal release lever 44 when the release mechanism 34 is in the blocking position (FIGS. 6 and 8-9). The spring device 46 biases the pivotal release lever 44 toward the release position but is held in the blocking position due to the weight force of the additive (e.g., chemical concentrate liquid) in the container (e.g., jug), which is supported by the additive-container support 48, which in turn is mounted to the pivotal release lever 44 (FIG. 10). When the container runs out of the additive, the now-reduced weight force it applies to the pivotal release lever 44 is insufficient to overcome the spring force of the spring device 46, which then discharges to pivotally drive the pivotal release lever 44 toward the release position where it clears its mechanical interference with the pivotal trigger 42, freeing the pivotal trigger 42 to be pivotally driven by the spring-loaded valve lever 38 as it pivots to the closed position under the force of its discharging spring 40 (FIGS. 7 and 11-13).

The release mechanism 34 is reset by moving the spring-loaded valve lever 38 back to the open position, compressing its valve spring 40. The trigger 42 is then pivotally repositioned to the blocking position (e.g., by applying a manual force to a handle arm 53 opposite the engagement arm 52, with the pivot 43 between them) with its engagement-arm blocking surface 52 contacting the valve lever 38 and mechanically interfering with and blocking it against pivotal movement from the valve spring 40 force. While manually holding the trigger 42 in the blocking position (which in turn holds the valve lever 138 in the open position), the full container/jug 18 is placed on the bracket/hook 48. The weight force of the full container/jug 18 overcomes the spring force of the spring plunger 46 and thereby causes the release lever 44 to reposition to the blocking position where it contacts the linking surface 56 of the trigger's engagement arm 52 to block movement of the trigger 42. The weight of the full container/jug 18 thereby holds the springs 40 and 46 in compression with the valve device 32 held in the open position, so the trigger 42 is then released, and then the fluid-mixture dispensing system 10 is ready for further use.

During use, the additive/concentrate is drawn out of the container/jug (e.g., by a venturi) until it is again empty, at which time the spring-loaded plunger 46 again pushes the release lever 44 up enough to release the trigger 42 holding the spring-loaded valve lever 38, releasing the valve to snap completely closed to automatically shut off the water supply. This prevents any further flow of water to the sink until a full container/jug is put back in place to keep the spring-loaded valve 32 open.

In this way, the system automatically shuts off the flow of water to the sink, making the fluid-mixture dispensing system 10 inoperable until the chemical concentrate is replenished (e.g., by replacing with a fresh container of the chemical or by refiling the container with the chemical). In particular, the water/sanitizer dispensing system 10 is now inoperable because no water is flowing (the valve 32 has been closed) and because no chemical concentrate is flowing (there is no chemical concentrate remaining to draw, and regardless the lack of waterflow means the venturi or similar mixer 16 can no longer draw it). This automatic inoperability eliminates the possibility of the water running without the chemical added and contamination thus being allowed to remain on the items intended to be cleaned. Also, the water automatically shutting off provides a visual and audible indication to nearby workers that the chemical concentrate is depleted so that it can be immediately replenished to maintain efficiency. In addition, the fluid-mixture dispensing system 10 outfitted with the control valve device 30 can include only mechanical components, operable without the need for electrical power, to provide for enhanced safety considering the close proximity to water.

The invention is described herein with respect to a weight-actuated spring-biased control valve device for use in a sanitizer solution dispensing system for use in food-handling areas of grocery stores, food-processing plants, meat-packing plants, and other facilities where food is handled. However, the invention includes other aspects and embodiments for other applications and uses. For example, other embodiments include a weight-actuated spring-biased valve device for use with a different dispensing system. Such other embodiments can be adapted for other applications such as mixing and dispensing a different fluid additive/solute and/or a different fluid carrier/solvent. Some other embodiments includes a spring-loaded valve-release mechanism for use with a different spring-loaded valve. Such other embodiments can be adapted for other applications such as automatically turning on a fluid supply (by opening a valve that is spring-biased to its closed position) upon an increased or decreased weight force being realized.

As such, the present invention includes related embodiments adapted for implementation in a number of various different applications. These other embodiments and applications may include any involving disinfection, cleaning, and/or washing where a detergent, disinfectant, or other sanitizing agent/solute is diluted with water or another solvent, e.g., washing of boats and/or other vehicles, decontaminating large areas or surfaces in kitchens, food preparation and/or handling facilities, or manufacturing facilities. These other embodiments and applications may further include any in which a concentrate/solute must be diluted with water or another solvent, e.g., spraying of liquid fertilizer and/or pesticide on agricultural areas, spraying of coolants on machinery, spraying of paint and/or other coatings or materials on buildings and/or other large surfaces, and spraying of other coatings on other surfaces. In addition, these other embodiments and applications may further include any in which two or more liquids are combined at a specific concentration, e.g., uses in the beverage industry, for pharmaceuticals, and in animal husbandry.

In this embodiment, the release lever 44 is automatically controlled to block/retain the valve lever 38 in one position or release it to be spring-biased to another position. As such, the release lever 44 and the valve lever 38 inter-engage and inter-operate, but indirectly via the interposed trigger 42, and not by directly contacting each other. In other embodiments (such as that described below), the release lever and the valve lever inter-engage and inter-operate, but directly contacting each other, without an interposed trigger or other structure.

In yet other embodiments, the weight-actuated spring-biased valve device is configured for automatically resetting to the valve open position from the valve closed position upon replenishing of the additive. Such embodiments can include for example a spring-biased linkage that is engaged and operated upon application of the full weight force of the full additive container to return the spring-loaded valve-release mechanism to the blocking position which in turn drives the spring-loaded valve back to the valve open position.

In still other embodiments, the weight-actuated spring-biased valve device has a cam-and-follower design including a ramped surface and a follower element that slidingly inter-engage to displace a blocking element, against the biasing influence of a spring, from blocking engagement with the valve lever. Such embodiments can be configured for automatically resetting to the valve open position from the valve closed position upon replenishing of the additive.

FIGS. 14-19 show a weight-actuated spring-biased control valve device 130 according to a second example embodiment of the present invention. The weight-actuated control valve device 130 can be included in a fluid-mixture dispensing system of the same or similar type as described above in the first example embodiment, or it can be incorporated into other types of fluid-mixture dispensing systems known in the art. As such, further details of suitable fluid-mixture dispensing systems are not repeated for brevity.

The weight-actuated control valve device 130 has a substantially similar design and functional features as that of the first embodiment. For example, it can be used to mix an additive fluid (e.g., a solute) with a carrier fluid (e.g., a solvent) to produce a fluid mixture that is dispensed/delivered for its intended use. And the weight-actuated control valve device 130 operates to automatically shut off the flow of the carrier fluid to be mixed with the additive fluid upon depletion of the additive fluid to ensure a proper resulting mixture/concentration.

Further, this embodiment similarly includes a spring-loaded control valve 132 and a spring-loaded valve-release control mechanism 134. The spring-loaded valve 132 includes a flow valve 136, a valve operating lever 138 that moves (e.g., pivots) between an open position (permitting flow through the flow valve 136; FIGS. 14 and 17-18) and a closed position (blocking flow through the flow valve 136; FIGS. 15 and 19) and a spring element (e.g., a torsion spring) 140 that biases the valve lever 138 to the closed position. As such, the spring-loaded valve 132 can be of the same or similar type as that of the first embodiment, so further details are not repeated for brevity.

In addition, the spring-loaded valve-release control mechanism 134 includes a pivotal release lever 144 (e.g., a stainless steel plate), a release spring device 146 (e.g., a spring-loaded plunger), and an additive-container support 148 (e.g., a stainless steel plate hook). Also, a mount (e.g., a housing or other mounting structure such as a stainless steel plate or bracket) 150 is typically provided for mounting these components together in place. The release lever 144 is pivotally mounted (e.g., by pins or other pivots) to the mount 150, and the spring device 146 biases the valve-release mechanism 134 toward the unlocked/release position (e.g., against and between the mount 150 and the additive-container support 148). These components can be of the same or a similar type as that of the first embodiment, so further details are not repeated for brevity.

In this embodiment, however, there is no trigger (as in the first embodiment) or other interposed element needed between the release lever 144 and the valve lever 138. Instead, the spring-loaded valve 132 and/or the valve-release mechanism 134 are modified for the release lever 144 to provide direct contacting and blocking engagement with the valve lever 138.

For example, the spring-loaded valve 132 can be oriented at 90 degrees rotation relative to that of the first embodiment, with the linear flow axis of the flow valve 136 and the pivotal plane of the release lever 144 in a non-intersecting arrangement (i.e., parallel or in the same plane), as opposed to being perpendicular in the first embodiment. In this position of the spring-loaded valve 132, its valve lever 138 and the release lever 144 still move (e.g., pivot) in an intersecting arrangement (i.e., perpendicular or otherwise mechanically interfering). With no trigger or other interposed element that directly engages the valve lever 138, this arrangement provides a good contacting surface area for the direct engagement between the release lever 144 and the valve lever 138.

In addition, the engagement arm 160 of the release lever 144 can have a dimension (i.e., a height in the depicted embodiment) 161, in a plane perpendicular to (and thus intersecting) the pivotal plane of the release lever 144, that is sufficiently great to provide the intended blocking functionality as described herein. With no trigger or other interposed element that directly engages the valve lever 138, this arrangement provides a good contacting surface area for the direct engagement between the release lever 144 and the valve lever 138.

Furthermore, while the spring device 146 is still positioned so that it biases against the load arm 162 of the release lever 144, in this embodiment it can be positioned to bias against the additive-container support 148, for example as depicted (instead of directly against the load arm as in the first embodiment). This arrangement positions the spring device 146 farther from the release lever pivot 145 for good balancing of forces and precision of operation (without respect to the presence of absence of a trigger or other interposed element).

Moreover, the mount 150 can still provide for the pivotal mounting 145 of the release lever 144 (e.g., in a cantilevered arrangement) and can still include a spring-mounting location 147 (e.g., an extension, bracket, plate, tab, arm, or other structural member) to which the spring device 146 is mounted. This arrangement simplifies the design of the mount 150 (without respect to the presence of absence of a trigger or other interposed element).

In use, the fluid load is initially greater than the spring device 146 force so that the release lever 144 is held in its blocking position to hold the valve operating lever 138 in its open position, and upon removal of the load on the additive-container support 148 from depletion of the additive fluid, the spring device 146 forces the release lever 144 to displace toward its release position enough to disengage from and release the valve operating lever 138 to move to its closed position under the discharging force of its spring element to automatically shut off the supply of the carrier fluid. In this way, the valve-release mechanism 134 provides the same essential functionality as the first embodiment (but in a simplified design), as shown in FIGS. 16-19.

FIGS. 20-33 show a weight-actuated spring-biased control valve device 230 according to a third example embodiment of the present invention. The weight-actuated control valve device 230 can be included in a fluid-mixture dispensing system of the same or similar type as described above in the first example embodiment, or it can be incorporated into other types of fluid-mixture dispensing systems known in the art. As such, further details of suitable fluid-mixture dispensing systems are not repeated for brevity.

The weight-actuated control valve device 230 has a substantially similar design and functional features as that of the first and second embodiments. For example, it can be used to mix an additive fluid (e.g., a solute) with a carrier fluid (e.g., a solvent) to produce a fluid mixture that is dispensed/delivered for its intended use. And the weight-actuated control valve device 230 operates to automatically shut off the flow of the carrier fluid to be mixed with the additive fluid upon depletion of the additive fluid to ensure a proper resulting mixture/concentration.

Further, this embodiment similarly includes a spring-loaded control valve 332 and a spring-loaded valve-release control mechanism 334. The spring-loaded valve 232 includes a flow valve 236, a valve operating lever 238 that moves (e.g., pivots) between an open position (permitting flow through the flow valve 236; FIGS. 20 and 24) and a closed position (blocking flow through the flow valve 236; FIGS. 21 and 25), and a spring element (e.g., a torsion spring) 240 that biases the operating lever 238 to the closed position. As such, the spring-loaded valve 232 can be of the same or similar type as that of the first embodiment, so further details are not repeated for brevity.

In addition, the spring-loaded valve-release control mechanism 234 includes a pivotal release lever 244 (e.g., including an engagement arm 260 and a load arm 262), a release spring device 246 (e.g., a spring-loaded plunger), and an additive-container support 248 (e.g., a stainless steel plate hook). Also, a mount (e.g., a housing or other mounting structure such as a stainless steel plate or bracket) 250 is typically provided for mounting these components together in place. The release lever 244 is pivotally mounted (e.g., by pins or other pivots) to the mount 250, and the spring device 246 biases the valve-release mechanism 234 toward the unlocked/release position. These components can be of the same or similar type as that of the first and/or second embodiments, so further details are not repeated for brevity.

Furthermore, in this embodiment, as in the second embodiment, there is no trigger (as in the first embodiment) or other interposed element needed between the release lever 244 and the valve lever 238, and instead the spring-loaded valve 232 and the valve-release mechanism 234 are configured for the release lever 244 to provide direct contact and blocking engagement with the valve lever 238.

In this embodiment, however, the spring-loaded valve 232 is oriented at 90 degrees rotation (about its axis) relative to that of the second embodiment, with the linear flow axis of the flow valve 236 and the pivotal plane of the release lever 244 still in a non-intersecting arrangement (i.e., parallel or in the same plane), as in the second embodiment. The spring-loaded valve 232 is thus positioned so that the valve lever 238 and the release lever 244 move (e.g., pivot) in the same plane to provide the needed mechanical interference.

In the depicted embodiment, the valve lever 238 and the release lever 244 are both substantially flat and arranged for coplanar movement (the flat levers 238 and 244 in their entireties move in one common plane). In other embodiments, one or both of the levers 238 and 244 include an offset engagement member that extends transversely (e.g., perpendicularly) into the movement plane of the other, with only the offset engagement member portion arranged for the coplanar movement, and with the rest of the respective lever moving in a parallel offset plane.

In addition, the spring-loaded valve-release control mechanism 234 of this embodiment includes a reset spring device 266 that enables smooth and easy operation and resetting of the release control mechanism 234 for subsequent reuse. The reset spring device 266 is positioned to provide engagement and interference between, and to resiliently retract (e.g., deflect or deform) to release engagement/interference between, the release-valve engagement arm 260 and the valve lever 238, to allow the release-valve engagement arm 260 to pivot past or otherwise clear the valve lever 238 during the reset process (though the levers 238 and 244 can technically still be in frictional contact as they slide past each other). The reset spring device 266 biases the release lever 244 in the opposite angular direction as the release spring device 246 biases it, and can be of the same type as the release spring device 246, for example a spring-loaded plunger or another conventional spring element (e.g., a coil spring with a plunger).

In the depicted embodiment, the reset spring device 266 is positioned on the release lever 244 for retractable engagement with the valve lever 238. For example, the reset spring device 266 can be positioned on or at (e.g., axially extending from) the engagement arm 260 of the release lever 244, with the spring device 266 having a spring-biased element (e.g., a plunger 266a) repositionable against its spring-biasing force from an extended position (FIG. 26) to a retracted position (FIG. 28) in response to engagement with the valve lever 238. In other embodiments, the reset spring device can be positioned on or at (e.g., axially extending from) the valve lever for retractable engagement with the release-valve engagement arm (in a vice-versa arrangement).

Figure 26:
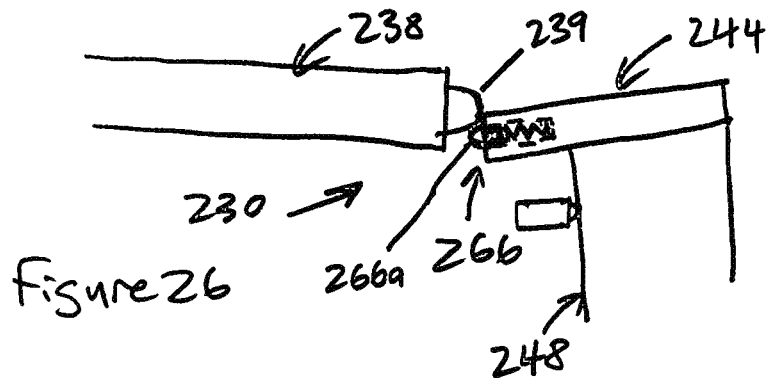
FIGS. 26-28 are perspective views of detail portions of the control valve of FIG. 20 shown in operational use.
Figure 27:
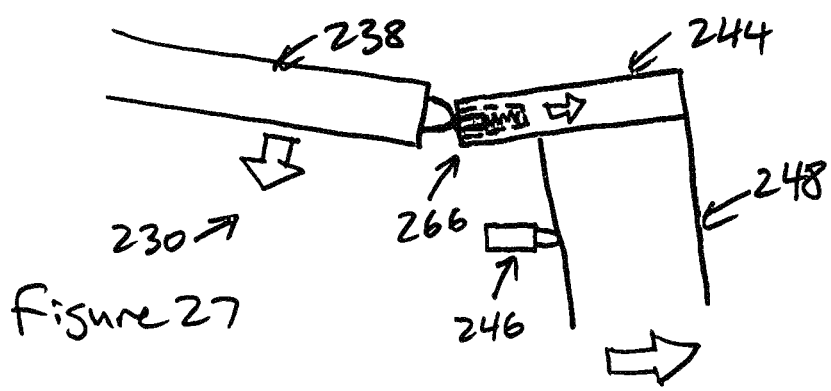
Figure 28:
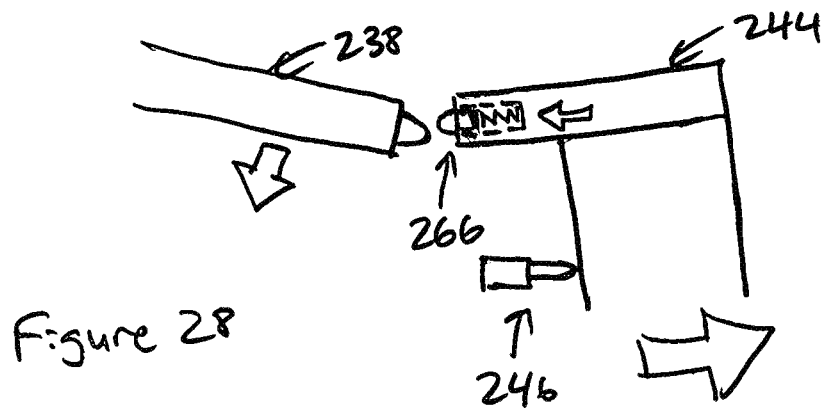

FIGS. 26-28 show details of the reset spring device 266 during the normal use of the control valve device 230. With the additive full, its fluid weight overcomes the release spring 246 force to retain the release lever 244 in the blocking position (FIG. 26). The reset spring plunger 266a is in the extended position engaging the valve lever 238, for example its engagement tip (e.g., ramped or tapered on one or both sides) 239. As the additive runs low, its lesser weight force results in the additive support 248 pivoting toward the release position under the influence of the release spring 246 (FIG. 27). The reset spring plunger 266a partially retracts (against its reset spring force, and under the stronger influence of the valve lever 238 being biased by its valve spring 240) toward its retracted position, but is still in blocking engagement with the valve lever 238. And when the additive runs out, its now even lesser (e.g., zero) weight force results in the additive support 248 pivoting to the release position under the influence of the release spring 246 (FIG. 28). The reset spring plunger 266a is now fully retracted into its retracted position to allow the valve lever 238 to swing past the release lever 244 and to the closed position. Once the valve lever 238 is clear of the release lever 244, the reset spring plunger 266a resiliently returns to its extended position. This configuration provide for a smooth transition as the valve operating lever 238 releases and moves from its closed position to its open position.

As such, the valve spring 240 and the reset spring 266 are selected with spring constants that are sufficiently comparable to balance each other when the additive is running low but not empty, so that the valve spring 240 cannot overcome the reset spring 266 force and allow the valve lever 238 to swing past the release lever 244 to the closed position when the additive is running low but not empty. At the same time, the valve spring 240 is selected with its spring constant being sufficiently greater than that of the reset spring 266 to allow the valve spring 240 force to overcome the reset spring 266 force and to thereby allow the valve lever 238 to swing past the release lever 244 to the closed position when the additive is empty (e.g., completely empty or sufficiently so to allow industry customary tolerances and still accomplish the functionality described herein).

Figure 29:
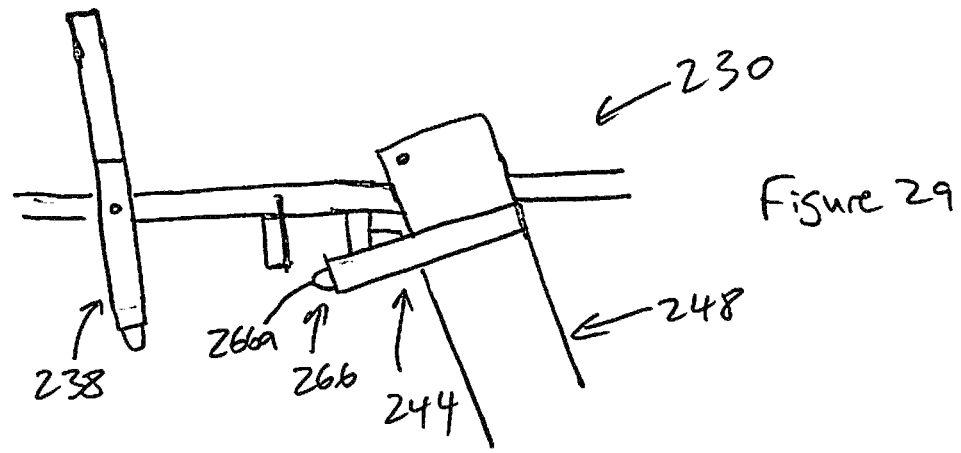
FIGS. 29-33 are perspective views of the control valve of FIG. 20, showing a manual reset process for subsequent use after the valve has been actuated to its closed position.
Figure 30:
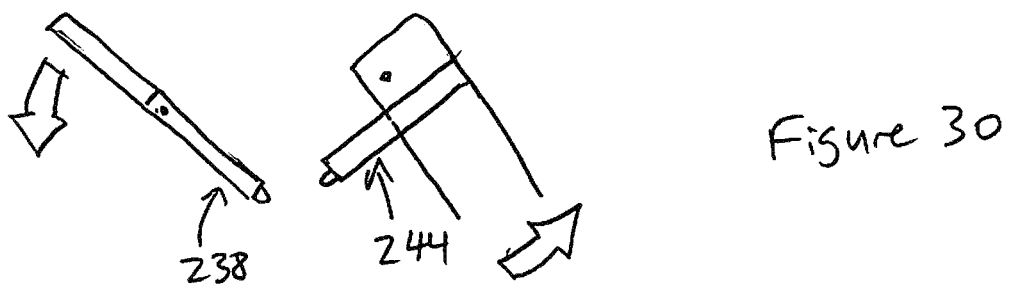
Figure 31:
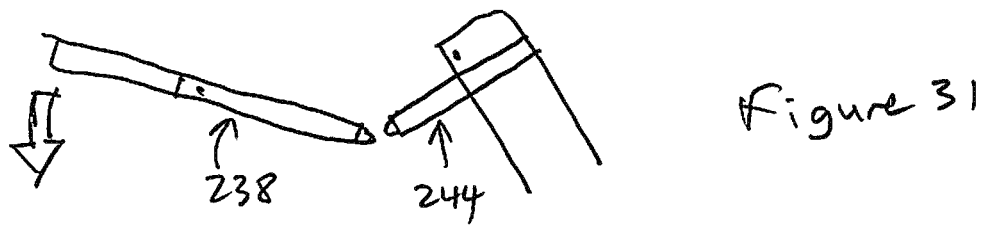
Figure 32:
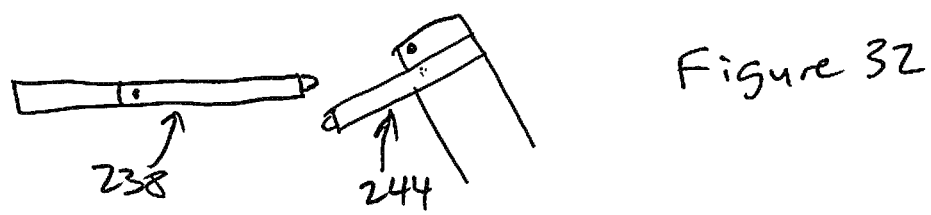
Figure 33:
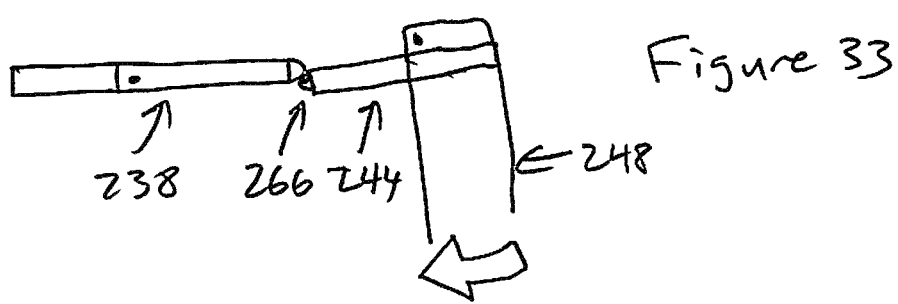

FIGS. 29-33 show details of the reset spring device 266 during resetting of the control valve device 230 for subsequent use. After normal operation of the control valve device 230, the valve lever 238 is in the closed position and the release lever 244 is in the release position (FIG. 29). Then a user can use one hand to manually pivot the valve lever 238, against its valve spring 240 force, toward its open position (FIGS. 30-31). If needed, the release lever 244 can be pivoted farther away from its blocking position (e.g., by pivoting the additive support member 248 in the opposite angular direction by the user's free/other hand). After the valve operating lever 238 clears/pivots past the release lever 244, the user holds it there and, with the other/free hand, installs a new or refilled container of the additive fluid on the support 248 to force/hold the release lever 244 in its blocking position (FIG. 32). Then the valve operating lever 238 is manually released so it can reverse pivot (under its spring force) back into forced contact with the valve operating lever 238 for continued use of the weight-actuated control valve device 230 to control flow of the carrier fluid for mixing with the additive fluid (FIG. 33), with the control valve device 230 now reset for subsequent use. In this embodiment, the control valve device 230 can be rest in a 2-step process (instead of a 3-step process) that prevents an incorrect reset (i.e., with the release lever 244 being out of position and requiring further adjustment).

In another embodiment, the weight-actuated spring-biased valve control device provides for a one-handed reset process to reset the valve control device for subsequent use. In this embodiment, the repositionable plunger element of the rest spring device in the retracted position provides the needed clearance between the valve operating lever and the release lever for movement between their operational positions during normal use, as described above. However, resetting can be done with one hand by manually pivoting the valve operating lever from the closed position back toward the open position until it contacts the reset spring plunger in its extended position, forces it to displace/retract into its retracted/clearance position, and pivots past the release lever into its open position. In this embodiment, the valve control device also includes a mechanical stop member (e.g., a tab, bracket, arm, or surface of the mounting plate/structure) that limits the travel range of the release lever so that when unloaded (i.e., no fluid additive weight) its pivotal travel (under the release spring force) is limited to a release position in which the reset spring plunger (in its extended position) extends into the pivotal travel path of the valve lever. This provides the needed interference and engagement between the valve operating lever and the release lever for the valve operating lever to engage and drive the release lever back to its blocking position when moving the valve operating lever through the reset motion back to its open position, which can be easily done with one hand.

In addition, the valve operating lever 238 can include a reset handle/flag 268. In the depicted embodiment, the reset handle 268 is a separate piece that is aligned with, is attached to, and extends from the valve operating lever 238 (in the opposite direction from the release valve 244, that is, on the opposite side of the flow valve 236). In this way, when the valve lever 238 is in the open position, the reset handle 268 protrudes in a conspicuous manner to provide an indication (e.g., flag or notice) that the control valve 232 has been actuated closed and the additive fluid needs replenishing. Also, in some embodiments such as that depicted, the reset handle 268 is a structural member that can be manually grasped and moved to reset the valve operating lever 238.

In addition to the reset handle 268 extending from and beyond the valve operating lever 238 in a direction away from the valve 232, the reset handle 268 can extend axially along a substantial or entire length of the valve operating lever 238, though typically the engagement tip 239 of the valve operating lever 238 remains exposed for operationally contacting the release lever 244, as depicted. As such, this extension of the reset handle 268 can be considered to be part of, or the same as, the valve lever 238, as the terms are used herein. In other embodiments, the reset handle extends only from/beyond the valve operating lever in a direction away from the valve and does not extend axially along a substantial length of the valve operating lever, or the reset handle additionally extends from and beyond the engagement tip of the valve operating lever such that it is the portion of the valve operating lever that operationally contacts the release lever. In any such embodiments, the engagement tip of the valve operating lever is typically ramped on one or both sides/surfaces.

In the depicted embodiment, the repositionable element of the spring device 266 is a spring-biased plunger 266a that linearly reciprocated between extended and retracted position. In other embodiments, the repositionable element of the spring device is a resiliently deflectable or deformable element (e.g., a portion of a cantilever spring, a leaf spring, or another resilient member) that moves from a normal/extended position to a deflected/retracted position to provide the same functionality.

Also, the release-lever engagement arm 260 (e.g., an acrylic or other polymeric bar) and the release-lever load arm 262 (e.g., a stainless steel plate) can be provided as two separate elements attached together, not necessarily in linearly opposing alignment but still functioning as a lever with the pivot as the fulcrum, for example as depicted. That is, the release lever 244 can be configured with its load arm 262 transversely offset from and not in the same pivotal plane as the engagement arm 252.

In this way, the valve-release mechanism 234 of the third embodiment provides substantially the same functionality as the second embodiment, in another operationally effective design, and also provides for a simple and easy valve-resetting process for continuing use.

In another embodiment, the release spring device (that biases the release lever toward the unlocked/release position) is eliminated from the valve-release mechanism so that, when the additive fluid container is depleted or removed from the additive support, the release lever can be freely pivoted between its blocking and release position with no applied force (other than that of the weight of its own components) biasing it toward either position. In such embodiments, the valve operating lever can easily displace the release lever during the reset process because the release lever is not spring-biased against this movement, while the valve spring force still is sufficient to actuate the valve operating lever upon depletion of the fluid, and while the fluid container load still is sufficient to retain the release lever in its blocking position holding the valve operating lever in its open position.

The design options of the first, second, and third embodiments can be provided individually to form additional embodiments, and they can be provided in any combination to form further additional embodiments. As such, the modifications shown and described in each example embodiment are not intended to be limited to only being implemented all together and instead can be selectively implemented as may be useful in a desired application.

While the invention has been described with reference to example embodiments, it will be understood by those skilled in the art that a variety of modifications, additions, and deletions are within the scope of the invention, as defined by the following claims.

What is claimed is:

1. A weight-actuated spring-biased valve device for controlled fluid-mixing, comprising:
   a spring-loaded valve mechanism including a flow valve, a valve operating lever that moves between a first position and a second position, and a valve spring element that biases the valve operating lever to the first position; and
   a spring-loaded valve-release control mechanism that locks the valve operating lever in the second position and selectively releases the valve operating lever from the second position to move under the biasing force of the valve spring element to the first position, wherein the control mechanism includes a release lever having an engagement arm and an opposite load arm, and a release spring device that biases the release lever from a blocking position with the engagement arm retaining the valve operating lever in its second position to a release position with the valve operating lever free to move past the engagement arm and to the first position under the biasing force of the valve spring element, wherein the release-lever load arm supports a load of an additive fluid to be mixed with a carrier fluid whose flow is controlled by the flow valve,
   wherein in use, upon removal of the additive-fluid load on the load arm from depletion of the additive fluid, the biasing force of the release spring device is then greater than the load of the additive fluid, so the release lever displaces under the biasing force of the release spring device from its blocking position toward its release position to disengage from the valve operating lever, which in turn then moves from its second position to its first position under the biasing force of the valve spring element.

2. The weight-actuated spring-biased valve device of claim 1, wherein the first position of the valve operating lever is a closed position and the second position is an open position.

3. The weight-actuated spring-biased valve device of claim 1, wherein the valve lever is pivotal so that it pivots between its first and second positions, and wherein the release lever is pivotal so that it pivots between its blocking and release positions.

4. The weight-actuated spring-biased valve device of claim 1, wherein the release-lever load arm includes an additive-container support that supports the additive-fluid load.

5. The weight-actuated spring-biased valve device of claim 4, wherein the additive-container support is a hook that supports a container of the additive fluid.

6. The weight-actuated spring-biased valve device of claim 1, wherein the carrier fluid is water and the additive fluid is a chemical sanitizer concentrate fluid.

7. The weight-actuated spring-biased valve device of claim 6, wherein the spring-loaded valve-release control mechanism operates the spring-biased valve mechanism to shut off flow of the water upon depletion of the chemical sanitizer concentrate fluid to ensure a predetermined mixture ratio results.

8. The weight-actuated spring-biased valve device of claim 1, wherein the release lever in its blocking position indirectly engages and retains the valve lever in its second position via an interposed trigger member.

9. The weight-actuated spring-biased valve device of claim 1, wherein the release spring device is a spring-biased plunger device.

10. The weight-actuated spring-biased valve device of claim 1, wherein at least an engagement tip portion of the valve operating lever and at least an engagement arm portion of the release lever travel are arranged for coplanar movement to provide interference with the valve operating lever in the second position and the release lever in the blocking position.

11. The weight-actuated spring-biased valve device of claim 1, wherein the spring-loaded valve is oriented with a linear flow axis of the flow valve and a motion plane of the release lever in a non-intersecting arrangement.

12. The weight-actuated spring-biased valve device of claim 1, wherein the spring-loaded valve-release control mechanism further includes a reset spring device that biases the release lever in an opposite angular direction than the release spring device biases it.

13. The weight-actuated spring-biased valve device of claim 12, wherein the reset spring device is positioned to provide engagement and interference between, and to resiliently retract to release engagement/interference between, the release-valve engagement arm and the valve operating lever, to allow the release-valve engagement arm to move past the valve operating lever during operation.

14. The weight-actuated spring-biased valve device of claim 1, wherein the valve operating lever of the spring-loaded valve includes a reset handle extending in an opposite direction from the release valve and on an opposite side of the flow valve, wherein the reset handle can be manually moved to reset the valve operating lever from its first position to its second position.

15. The weight-actuated spring-biased valve device of claim 14, wherein when the valve operating lever is in its first position, the reset handle protrudes in a conspicuous manner to provide an indication that the flow valve has been actuated to its first position and the additive fluid needs replenishing.

16. A method of resetting the weight-actuated spring-biased valve device of claim 1, including moving the valve operating lever, against its valve spring force, past and clear of the release-lever engagement arm to past its second position, then reloading the load of additive fluid on the release-lever load arm which load then overcomes the biasing force of the release spring device and in turn moves the release arm to its blocking position, and releasing the valve operating lever to reverse travel under its valve spring force into forced contact with the valve lever for continued use of the weight-actuated control valve device to control flow of the carrier fluid for mixing with the additive fluid.

17. A weight-actuated spring-biased valve device for controlled fluid-mixing, comprising:
   a spring-loaded valve mechanism including a flow valve, a valve operating lever that pivots between a closed position and an open position, and a valve spring element that biases the valve operating lever to the closed position; and
   a spring-loaded valve-release control mechanism that locks the valve operating lever in the open position and selectively releases the valve operating lever from the open position to move under the biasing force of the valve spring element to the closed position, wherein the control mechanism includes a pivotal release lever having an engagement arm and an opposite load arm, and a release spring device that biases the release lever from a blocking position with the engagement arm retaining the valve operating lever in its open position to a release position with the valve operating lever free to pivot past the engagement arm and to the closed position under the biasing force of the valve spring element, wherein the release-lever load arm includes an additive-container support that supports a load of an additive fluid to be mixed with a carrier fluid whose flow is controlled by the flow valve,
   wherein in use, upon removal of the additive-fluid load on the load arm from depletion of the additive fluid, the biasing force of the release spring device is then greater than the load of the additive fluid, so the release lever pivotally displaces under the biasing force of the release spring device from its blocking position toward its release position to disengage from the valve operating lever, which in turn then pivots from its open position to its closed position under the biasing force of the valve spring element, and
   wherein the carrier fluid is water, the additive fluid is a chemical sanitizer concentrate fluid, and the spring-loaded valve-release control mechanism operates the spring-biased valve mechanism to shut off flow of the water upon depletion of the chemical sanitizer concentrate fluid to ensure a predetermined mixture ratio results.

18. The weight-actuated spring-biased valve device of claim 17, wherein the spring-loaded valve-release control mechanism further includes a reset spring device that biases the release lever in an opposite angular direction than the release spring device biases it, and wherein the reset spring device is positioned to provide engagement and interference between, and to resiliently retract to release engagement/interference between, the release-valve engagement arm and the valve operating lever, to allow the release-valve engagement arm to pivot past the valve operating lever during operation.

19. The weight-actuated spring-biased valve device of claim 17, wherein the valve operating lever of the spring-loaded valve includes a reset handle extending in an opposite direction from the release valve and on an opposite side of the flow valve, wherein the reset handle can be manually pivoted to reset the valve operating lever from its closed position to its open position, and wherein when the valve operating lever is in its closed position, the reset handle protrudes in a conspicuous manner to provide an indication that the flow valve has been actuated to its closed position and the chemical sanitizer concentrate fluid needs replenishing.

20. A method of resetting the weight-actuated spring-biased valve device of claim 17, including pivoting the valve operating lever, against its valve spring force, past and clear of the release-lever engagement arm to its open position, then reloading the load of chemical sanitizer concentrate fluid on the release-lever load arm which load then overcomes the biasing force of the release spring device and in turn moves the release arm to its blocking position, and releasing the valve operating lever which is now retained in its open position by the loaded release lever, for continued use of the weight-actuated control valve device to control flow of the water for mixing with the chemical sanitizer concentrate fluid.

* * * * *